(12) United States Patent
Hu et al.

(10) Patent No.: US 12,357,439 B2
(45) Date of Patent: Jul. 15, 2025

(54) ELECTRIC HANDLE, ELECTRIC TOOTHBRUSH AND ELECTRIC CLEANING BRUSH

(71) Applicant: Feifan Hu, Guangdong (CN)

(72) Inventors: Feifan Hu, Guangdong (CN); Jiankun Hu, Guangdong (CN)

(73) Assignee: Feifan Hu, Shenzhen (CN)

( * ) Notice: Subject to any disclaimer, the term of this patent is extended or adjusted under 35 U.S.C. 154(b) by 1002 days.

(21) Appl. No.: 17/406,060

(22) Filed: Aug. 18, 2021

(65) Prior Publication Data

US 2021/0386535 A1    Dec. 16, 2021

Related U.S. Application Data

(63) Continuation of application No. PCT/CN2019/091859, filed on Jun. 19, 2019.

(30) Foreign Application Priority Data

Nov. 12, 2018   (CN) .......................... 201821867329.8

(51) Int. Cl.
| | | |
|---|---|---|
| *A61C 17/22* | (2006.01) | |
| *A46B 9/04* | (2006.01) | |
| *A46B 13/02* | (2006.01) | |
| *A46B 15/00* | (2006.01) | |

(52) U.S. Cl.
CPC .............. *A61C 17/225* (2013.01); *A46B 9/04* (2013.01); *A46B 13/02* (2013.01); *A46B 15/0004* (2013.01)

(58) Field of Classification Search
CPC . A46B 13/02; A46B 15/0002; A46B 15/0004; A61C 17/225
See application file for complete search history.

(56) References Cited

FOREIGN PATENT DOCUMENTS

| | | | | |
|---|---|---|---|---|
| CN | 102026588 A | * | 4/2011 | ......... A61C 17/3481 |
| CN | 204890237 U | * | 12/2015 | |
| CN | 205433976 U | * | 8/2016 | |
| CN | 107693148 A | * | 2/2018 | ............. A61C 17/26 |
| JP | 2005261462 A | * | 9/2005 | ......... A61C 17/3481 |

\* cited by examiner

*Primary Examiner* — Randall E Chin

(57) ABSTRACT

Provided are an electric handle, an electric toothbrush and an electric cleaning brush. The electric handle comprises a housing, a rear cover, a swing motor and a main control structure. By installing a vibration control mass with limited mass, the rotational inertia of the stator of the swing motor is increased, so that the vibration amplitude of the shell of the swing motor is reduced. It also reduces the vibration amplitude transmitted to the control circuit board, battery and electric handle, decreases the vibration feeling in user's hand, and makes the output shaft of the swing motor transmit effective swing output as much as possible. Then the swing output is transmitted to the toothbrush head or cleaning brush head installed on the output shaft.

12 Claims, 4 Drawing Sheets

ELECTRIC HANDLE, ELECTRIC TOOTHBRUSH AND ELECTRIC CLEANING BRUSH

CROSS REFERENCE TO RELATED APPLICATIONS

The present application is a Continuation Application of PCT Application No. PCT/CN2019/091859 filed on Jun. 19, 2019, which claims the benefit of Chinese Patent Application No. 201821867329.8 filed on Nov. 12, 2018. All the above are hereby incorporated by reference in their entirety.

TECHNICAL FIELD

The disclosure relates to the technical field of cleaning brushes, in particular to an electric handle, an electric toothbrush and an electric cleaning brush.

BACKGROUND

At present, electric toothbrush usually consists of two parts, electric handle and toothbrush head. The electric handle is the key, which generally includes a housing, a rear cover, a swing motor and a main control structure. The swing motor is connected to the main control structure, on which a control circuit board and a battery are installed. As the swing motor drives the toothbrush head to swing, it would cause the main control structure and the handle to swing. When the main control structure swings too much, it will bring adverse effects to the control circuit board and battery, such as loose electrical connections of electronic components on the circuit board. If the swing of the handle is too large, users would feel uncomfortable when holding it, and at the same time, the swing amplitude output to the toothbrush head would be reduced, which would weaken the cleaning effect of the electric toothbrush.

In order to reduce the swing of the control circuit board, battery and housing, and improve the comfortable feeling to users, generally, a resilient cushion member is arranged in the handle housing. For example, installing a resilient cushion member between the swing motor and main body bracket. The installation of the resilient cushion member between the swing motor and housing can reduce the vibration transmitted by the swing motor, but it does not reduce the useless swing or enhance the effective swing at the source.

SUMMARY

The disclosure provides an electric handle, an electric toothbrush and an electric cleaning brush, aiming at fundamentally solving the problem that the existing technology cannot reduce the useless swing of electric handle or enhance the effective swing.

To solve the above technical problems, the present application provides an electric handle, including a housing, a rear cover, a swing motor and a main control structure; an installation cavity is formed in the housing and the rear cover, and the swing motor and the main control structure are serially installed in the installation cavity, one behind another; the swing motor is provided with an output shaft, and the output shaft of the swing motor extends from an front end of the housing; the main control structure comprises a main body bracket and a battery and a control circuit board installed on the main body bracket; the main body bracket is clamped on an inner wall of the housing; and a gap is formed between the swing motor and the inner wall of the housing, and a vibration control mass is arranged at the gap, the vibration control mass is fixed on an outer shell of the swing motor and does not contact with the inner wall of the housing.

Further, a front end of the swing motor is sleeved with a sealing top ring and an elastic sealing ring, the elastic sealing ring sleeved on the output shaft is tightly pressed by the sealing top ring, the elastic sealing ring is pressed against the front end of the housing; a tail end of the swing motor is installed on the main body bracket through a resilient cushion member sleeved on the swing motor.

Further, there are one or more vibration control masses, and the shape is flat, and is installed and fixed on the outer shell of the swing motor corresponding to the gap.

Further, the vibration control mass is fixed on the outer shell of the swing motor corresponding to the gap in a semi-wrapped shape. The outer shell of the swing motor is half-covered by the vibration control mass, which increases the surface area of the vibration control mass, and correspondingly reduces the thickness of the vibration control mass when the mass is the same, thus reducing the space requirement of the gap for installment.

Further, the outer shell of the swing motor is provided with a concave part, and a conformal vibration control mass is fixedly installed at the concave part, and the conformal vibration control mass is matched with the longitudinal contour of the swing motor.

Further, the swing motor is installed in the housing at a certain inclination angle, so that the axis line of the swing motor deviates from the centerline of the electric handle, and the gap where the swing motor deviates from the centerline of the electric handle increases, the vibration control mass is installed on the outer shell of the swing motor corresponding to the gap. The inclined installation of the swing motor increases the gap, making it easier to install the vibration control mass.

The electric handle provided by the disclosure has the following beneficial effects:

In the electric handle provided by the disclosure, by installing a vibration control mass with limited mass, the rotational inertia of the stator of the swing motor is increased, so that the vibration amplitude of the outer shell of the swing motor is reduced. It also reduces the vibration amplitude transmitted to the control circuit board, battery and electric handle, decreases the vibration in user's hand to improve hand feeling. Meanwhile, the effective vibration amplitude output by the swing motor is increased, so that the vibration amplitude of toothbrush head or cleaning brush head installed on the output shaft is increased, and the cleaning effect is better. In this way, the vibration amplitude of the stator of the swing motor is reduced at the source, and the design of the swing motor is more flexible without considering the inertia of the stator, and the swing motor can be made lighter and smaller. Similarity, the electric handle can be designed to be light, which would make users feel more comfortable and lighter when holding it, and the production cost is also reduced. That is to say, in different applications, even if the loads are different and the rotational inertia of the rotor is different, the same swing motor can be used, only need to adjust the vibration control mass, the vibration amplitude of the outer shell of the swing motor would not increase, and the effective vibration amplitude output by the swing motor would not decrease. To be specific, in the design of electric handle, simply by installing a suitable vibration control mass, the load can be driven by a swing motor with small size and light weight, and the unfavorable swing can be suppressed and the favorable swing can be strengthened. At the same time, the small-sized swing motor allows more gaps, which is beneficial to the installation of the vibration control mass, and also makes the installation of the swing motor more flexible, because the inclination angle can be adjusted as required, which further reduces the vibration of the handle. In this way, the handle can be designed to be lighter, smaller and more portable, convenient for holding.

The embodiment further provides an electric toothbrush, including the above-described electric handle and toothbrush head, the toothbrush head is inserted at the output shaft of the swing motor.

The electric toothbrush provided by the disclosure has the following beneficial effects:

The electric toothbrush in this embodiment adopts the above-described electric handle, which fundamentally reduces the vibration amplitude of the swing motor housing by installing a vibration control mass with limited mass on the outer shell of the swing motor. It also reduces the vibration amplitude transmitted to the control circuit board, battery and electric handle housing, decreases the vibration in user's hand to improve hand feeling. Meanwhile, the effective vibration amplitude output by the swing motor is increased, so that the favorable swing of the toothbrush head is strengthened, and the cleaning effect is better. Thus, the handle can be designed to be lighter, the hand feeling is more comfortable when using, and the production cost is also reduced. Therefore, a swing motor with small size and light weight may be adopted, the installation is more flexible, and the inclination angle can be adjusted as required, so that the toothbrush head is inclined, which conforms to ergonomics, and is more convenient when user brushes teeth. It also makes the moment of inertia of the handle larger and further reduces the vibration of the handle.

The embodiment further provides an electric cleaning brush, including the above-described electric handle and a cleaning brush head, the cleaning brush head is inserted at the output shaft of the swing motor.

The electric cleaning brush provided by the disclosure has the following beneficial effects:

The electric cleaning brush in this embodiment adopts the above-described electric handle, which fundamentally reduces the vibration amplitude of the swing motor housing by installing a vibration control mass with limited mass on the outer shell of the swing motor. It also reduces the vibration amplitude transmitted to the control circuit board, battery and electric handle housing, decreases the vibration in user's hand to improve hand feeling. Meanwhile, the effective vibration amplitude output by the swing motor is increased, so that the favorable swing of the cleaning brush head is strengthened, and the cleaning effect is better. The hand feeling is more comfortable when using, and the production cost is also reduced.

Figure 1:
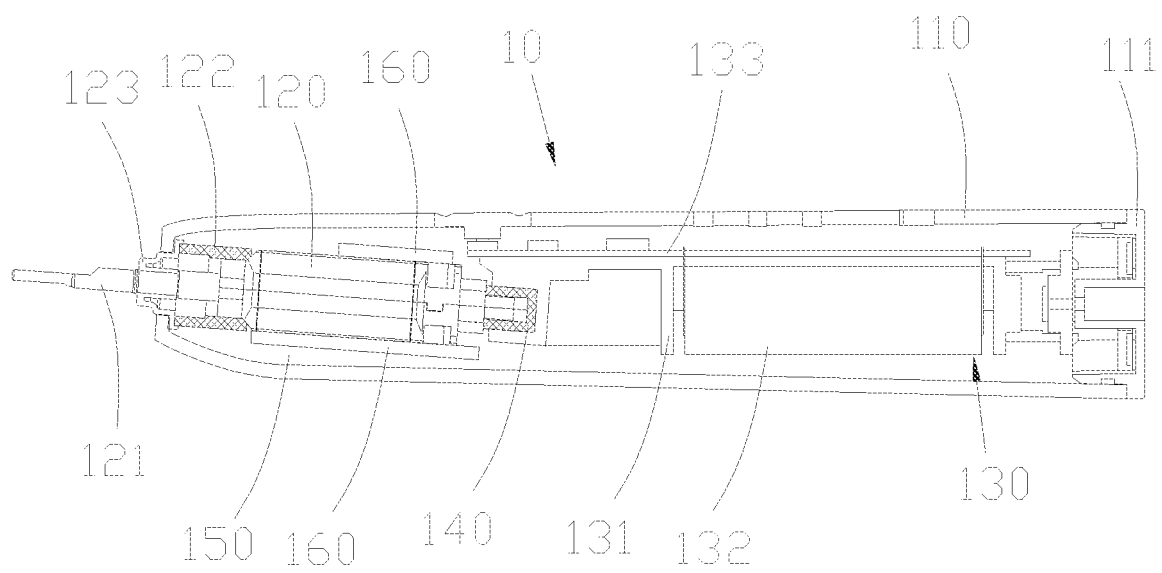
FIG. 1 is a structural schematic diagram of an electric handle provided by an embodiment of the disclosure.

| Reference numerals in the figures are as follows: | |
|---|---|
| 10 | Electric handle |
| 20 | Electric toothbrush |
| 110 | Housing |
| 111 | Rear cover |
| 120 | Swing motor |
| 121 | Output shaft |
| 122 | Sealing top ring |
| 123 | Elastic sealing ring |
| 124 | Tail end |
| 125 | Concave part |
| 130 | Main control structure |
| 131 | Main body bracket |
| 132 | Battery |
| 133 | Control circuit board |
| 140 | Resilient cushion member |
| 150 | Gap |
| 160 | Vibration control mass |
| 161 | Conformal vibration control mass |
| 170 | Handle centerline |
| 180 | Motor axis line |
| 210 | Toothbrush head |

DETAILED DESCRIPTION

In order to make the purpose, technical solutions and advantages of the disclosure clearer, the disclosure will be further described in detail with reference to the drawings and embodiments. It should be understood that the specific embodiments described here are only used to illustrate the disclosure, and not intended to limit the disclosure.

As shown in FIGS. 1-6, they are preferred embodiments provided by the disclosure. The purpose is to illustrate the electric handle protected by the disclosure in detail. The best way to apply the electric handle is to use in electric toothbrush. Thus, the following description mainly takes electric toothbrush as an example, to illustrate it in detail with the electric handle. However, in addition to being used in an electric toothbrush for brushing teeth, the toothbrush head may also be replaced with a cleaning brush head. In this way, the electric cleaning brush composed of a cleaning brush head and the electric handle is also the subject to be protected in the disclosure.

It should be noted that when a component is referred to as being "fixed" or "arranged" on another component, it may be directly on another component or an intervening component may be present. When a component is referred to as being "connected" to another component, it may be directly connected to another component or an intervening component may be present.

It should also be noted that the terms "left", "right", "up" and "down" in this embodiment are only relative concepts or refer to the normal use state of the product, and should not be regarded as limiting. The singular terms "a", "an" and "the" include plural reference and vice versa unless the context clearly indicates otherwise.

In this embodiment, the electric handle and the electric toothbrush using the electric handle will be explained in detail.

In the process of further research and application of the swing motor developed by the inventor, the applicant found that the swing motor, which has been patented, is small in size and light in weight, and has a very good brushing effect when applied to electric toothbrush. And the production cost is reduced. In the process of research and development, it is found that there is room for further improvement, and this application is one of the achievements of further improvement. The urgent problem to be solved in the research and development is how to effectively reduce the swing of the handle housing, strengthen the swing of the toothbrush head, and reduce the unfavorable swing of the control circuit board and battery. After many experiments and theoretical verification, the above problems have been solved and the research and development purpose has been achieved.

In order to make the person skilled in the art understand the concept of the invention, the concept will be explained with theoretical analysis and applied research. we found that both the swing of the housing 110 of the electric handle 10 and the vibration output to the toothbrush head 210 came from the swing motor 120. At present, the structure of the swing motor 120 is known to the public, including a stator and a rotor, and the rotor is generally provided with an output shaft from which the vibration is output.

Figure 2:
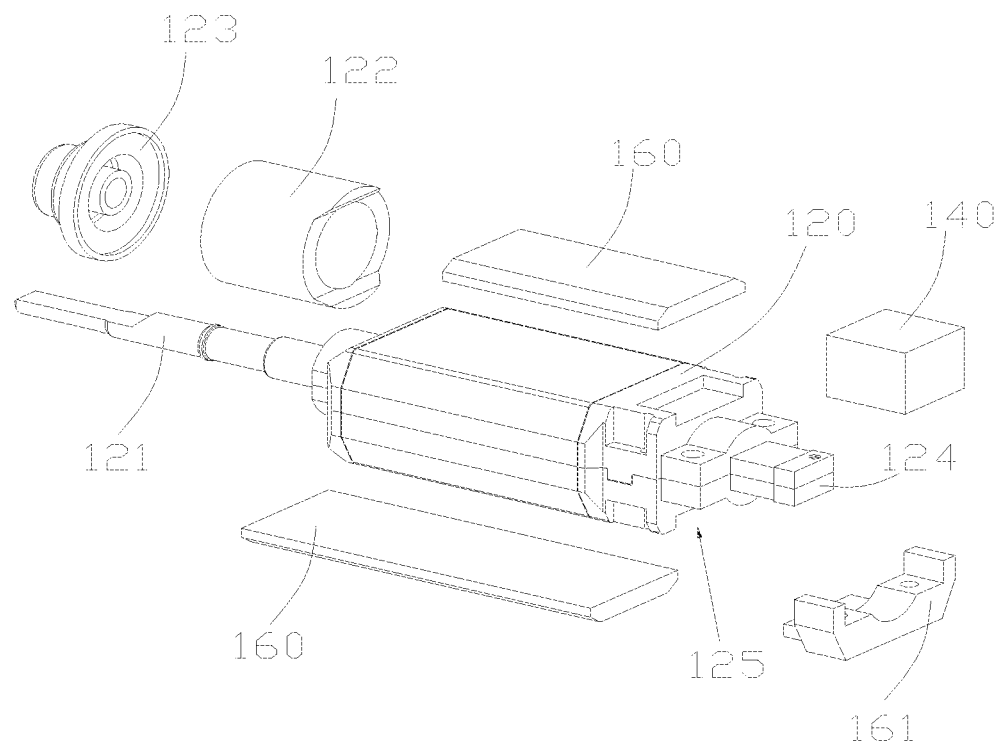
FIG. 2 is an exploded perspective view of the assembly parts of a swing motor provided by an embodiment of the disclosure.

As shown in FIGS. 1 and 2, the electric handle 10 provided in this embodiment has the following similarities with the conventional electric handle. It includes a housing 110, a rear cover 111, a swing motor 120 and a main control structure 130. An installation cavity is formed in the housing 110 and the rear cover 111, and the swing motor 120 and the main control structure 130 are serially installed in the installation cavity, one behind another; the swing motor 120 is provided with an output shaft 121, and the output shaft 121 of the swing motor 120 extends from an front end of the housing 110; the main control structure 130 comprises a main body bracket 131 and a battery 132 and a control circuit board 133 installed on the main body bracket 131; the main body bracket 131 is clamped on an inner wall of the housing 110.

It should be noted that the swing motor 120 adopted in this embodiment follows the following formulae:

rotational inertia of rotor: $J_{rotor}=\Sigma m_i r_i^2$; (1) $r_i$ is the distance from the rotor particle $m_i$ to the center of the rotating shaft;

kinetic energy of rotor: $E_{rotor}=\frac{1}{2}J_{rotor}\omega^2$; $\omega$ is the angular velocity of the rotor;

resultant moment of rotor:

$$M_{rotor} = J_{rotor} * \alpha = J_{rotor}\frac{d\omega}{dt};$$

(2) wherein $\alpha$ is the angular acceleration of the rotor.

assuming that the swing frequency is constant and the stator is stationary, then $J_{rotor}$ and $M_{rotor}$ are constant values, and the angular acceleration of the rotor relative to the stator is constant.

when the swing motor is powered on, the rotor generates electromagnetic reaction force to the stator, in an ideal state:

$$M_{rotor}=M_{stator} \quad (3).$$

rotational inertia of stator: $J_{stator}=\Sigma m_i r_i^2$ (4); $r_i$ is the distance from the stator particle $m_i$ to the center of the rotating shaft;

resultant moment of stator:

$$M_{stator} = J_{stator}\alpha' = J_{stator}\frac{d\omega'}{dt};$$

wherein $\alpha$ is the angular acceleration of the stator; according to formulas (1), (2), (3) and (4), $$M_{stator} = J_{stator}\alpha' = J_{stator}\frac{d\omega'}{dt'} = J_{rotor}\alpha = J_{rotor}\frac{d\omega}{dt}; \quad (5)$$

In actual application, the stator of the swing motor 120 is usually installed and connected with the main control structure 130 through a resilient cushion member 140. The mass of the stator is limited, and when the rotor swings, it will swing opposite to the main control structure 130 under the electromagnetic reaction force. The vibration amplitude of the rotor relative to the stator is unchanged, while the vibration amplitude of the rotor is reduced relative to the main control structure 130. The vibration of the stator acts on the main control structure 130 through the resilient cushion member 140. When the vibration amplitude of the stator is large, the vibration amplitude of the main control structure 130 will become large. In some applications, this is unfavorable to the main control structure 130, which may cause, for example, loosening or fatigue damage of electronic components on the main control structure 130. Therefore, the swing of the outer shell of the swing motor is a useless vibration, and the vibration of the electric handle caused by the swing motor is also a useless vibration that affects the hand feeling.

It can be seen from formulae (1) and (4) that the moment of inertia is related to the mass and its distance from the motor shaft center. Once the swing motor is manufactured, it is obviously impossible to change its structure, the moment of inertia of the stator is therefore a fixed value. However, vibration control mass can be added to the stator or the outer shell of the swing motor, which is far away from the motor shaft center, to increase the moment of inertia of the stator, so that the angular acceleration of the stator decreases and the vibration amplitude of the stator also decreases. It can be seen from the above that, relative to the main control structure 130, the vibration amplitude of the stator is reduced, which reduces the vibration amplitude transmitted from the outer shell to the main control structure 130 and increases the vibration amplitude of the rotor. In this way, the vibration amplitude of the stator of the swing motor is reduced at the source, and the design of the swing motor is more flexible. If the swing motor is designed to be small in size and light in weight, the moment of inertia of the stator will be small and the swing will be large when working. With this embodiment, the swing motor can be designed to be lighter and lower in cost, without considering the inertia of the stator. It can be seen from formula (5) that in different applications, when the load changes, the rotational inertia of the rotor changes, simply by adjusting the vibration control mass, the useless vibration amplitude of the stator can be suppressed without adjusting the motor.

As shown in FIG. 1 and FIG. 2, based on the above theoretical analysis, we have made further improvements. Besides the similarities with the conventional electric handle, it is important that a gap 150 is formed between the swing motor 120 and the inner wall of the housing 110, and a vibration control mass 160 is arranged at the gap 150. And the vibration control mass 160 is fixed on the outer shell of the swing motor 120, and the vibration control mass 160 does not contact with the inner wall of the housing 110.

The fixation of the vibration control mass 160 can be carried out in various ways, such as sticking with adhesive; fixing with fasteners; or embedding in a groove, first an embedded groove is formed on the outer shell of swing motor, and then the vibration control mass 160 is embedded and fixed in the groove; or welding on the surface of the swing motor; or any other fixation techniques, as long as it can bear the swing of the swing motor without falling off.

In the electric handle provided by the disclosure, by installing a vibration control mass 160 with limited mass, the rotational inertia of the stator of the swing motor 120 is increased, so that the vibration amplitude of the outer shell of the swing motor 120 is reduced at the source. It also reduces the vibration amplitude transmitted to the control circuit board 133, battery 132 and housing 110, decreases the vibration in user's hand to improve hand feeling. Meanwhile, the effective vibration amplitude output by the swing motor 120 is increased, and the cleaning effect of toothbrushing is better. And, the swing motor 120 and the vibration control mass 160 are not in direct contact with the inner wall of the housing 110 of the electric handle 10, the swing of the swing motor 120 would not be directly transmitted to the housing 110.

Furthermore, as shown in FIG. 1, in order to facilitate the installation and fixation of the swing motor 120 in the installation cavity and make the swing motor 120 have better waterproof and vibration reduction effects, specifically, the front end of the swing motor 120 is sleeved with a sealing top ring 122. The elastic sealing ring 123 sleeved on the output shaft 121 is tightly pressed by the sealing top ring 122, the elastic sealing ring 123 is pressed against the front end of the inner wall of the housing 110. The tail end 124 of the swing motor 120 is installed on the main body bracket 131 through the resilient cushion member 140 sleeved on it. In this way, the swing motor 120 is elastically supported in the housing 110 by its front and back ends, and forms a gap 150 with the inner wall of the housing in the axial direction.

Figure 3:
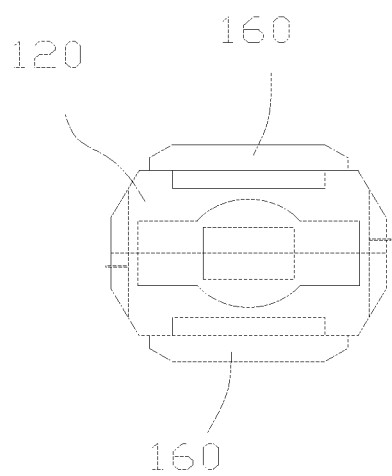
FIG. 3 is a structural schematic diagram of a vibration control mass provided by an embodiment of the disclosure.

As shown in FIG. 1, FIG. 2 and FIG. 3, regarding the first embodiment of the vibration control mass 160, there are one or more vibration control masses 160, and the shape is flat, and is installed and fixed on the outer shell of the swing motor 120. Specifically, the vibration control mass 160 with flat shape may be provided at a position where there is enough gap in the circumferential direction of the outer shell of the swing motor 120. The specific number of the vibration control mass 160 depends on the actual needs. For example, on the upper and lower sides of the outer shell of the swing motor 120, one or two flat vibration control mass 160 matched with the side surface are installed.

Figure 4:
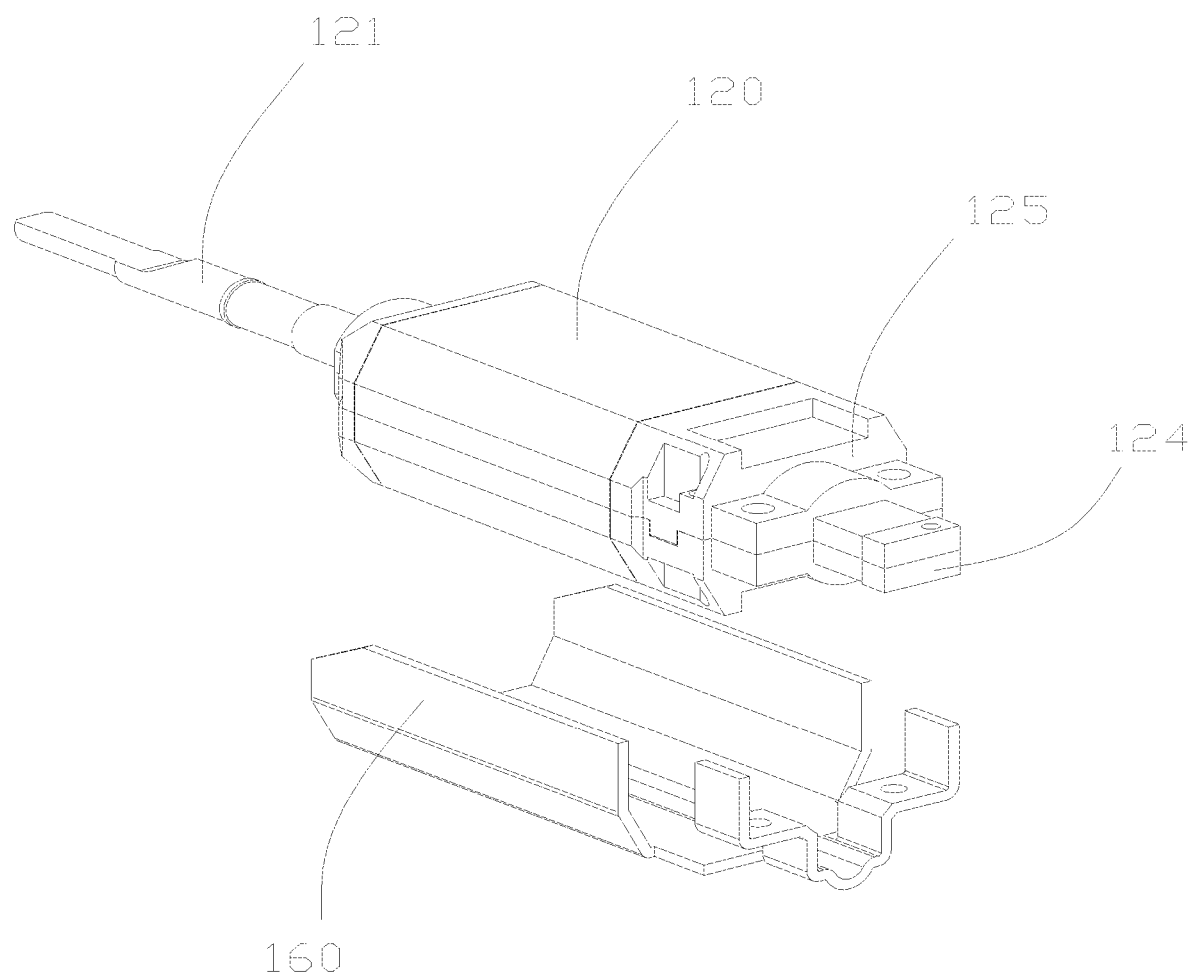
FIG. 4 is another structural schematic diagram of a vibration control mass provided by an embodiment of the disclosure.

With regard to the second embodiment of the vibration control mass 160, as shown in FIG. 4, the vibration control mass 160 is fixed on the outer shell of the swing motor 120 corresponding to the position with sufficient gaps in a semi-wrapped shape. The outer shell of the swing motor 120 is half-covered by the vibration control mass 160, which increases the surface area of the vibration control mass 160, and correspondingly reduces the thickness of the vibration control mass 160, thus reducing the space requirement of the gap 150 for installment, and the handle can be designed to be smaller. The vibration control mass 160 may be stamped out of thin steel plates, it is easy to manufacture.

Figure 5:
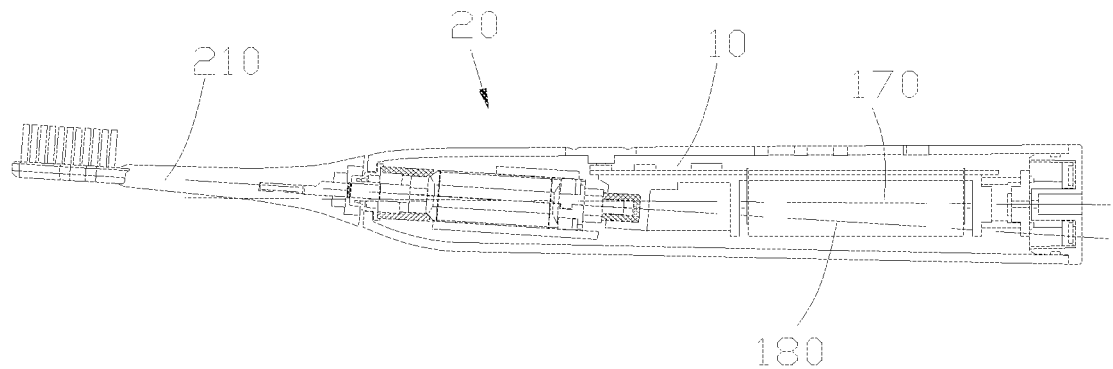
FIG. 5 is a structural schematic diagram of an electric toothbrush provided by an embodiment of the disclosure.
Figure 6:
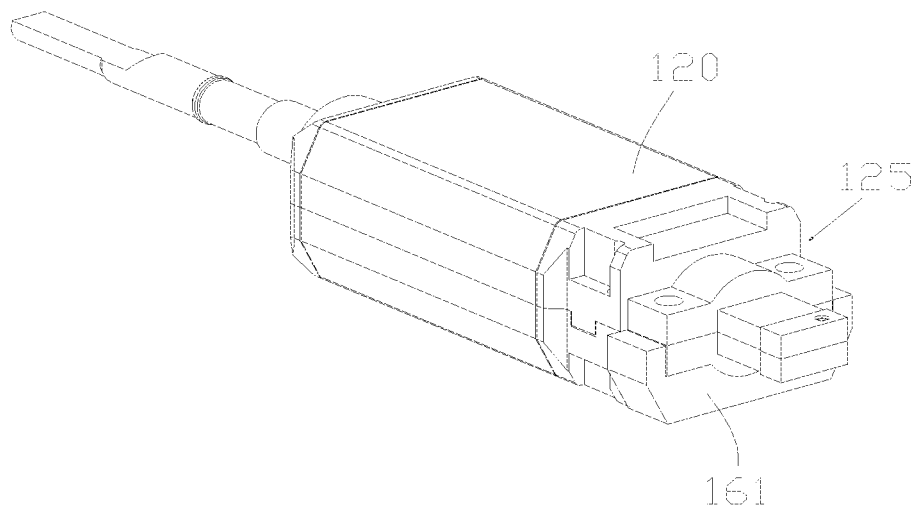
FIG. 6 is a structural schematic diagram of a conformal vibration control mass provided by an embodiment of the disclosure.

With regard to the third embodiment of vibration control mass 160, as shown in FIG. 5, when there is a concave part 125 on the outer shell of the swing motor 120, a conformal vibration control mass 161 may be fixedly installed at the concave part 125, which is matched with the longitudinal contour of the swing motor 120. In this way, the conformal vibration control mass 161 can not only reduce the vibration amplitude of the outer shell of the swing motor 120, but also fill the concave part 125 of the longitudinal contour of the outer shell, so that the longitudinal contour of the outer shell is smoother and has the function of preserving shape, which is more convenient for the installation of the swing motor 120 in the installation cavity.

As shown in FIG. 3, obviously, the vibration control mass 160 with flat shape may be arranged on the outer shell of the swing motor 120, at the same time, the conformal vibration control mass 161 is fixedly installed at the concave part 125.

It should be noted that in this embodiment, preferably, the vibration control mass 160 can be stamped and cut out of steel plates, which is low in cost and easy to manufacture. While the conformal vibration control mass 161 can be zinc alloy die casting material with a large specific gravity, which is low in cost and easy to manufacture. However, the specific material selections of the vibration control mass 160 and conformal vibration control mass 161 are not limited to the above, as long as they are a metal or alloy material which are easy to cut and shape, manufacture and recycled.

Furthermore, the swing motor 120 is installed in the housing 110 at a certain inclination angle, so that the motor axis line 180 of the swing motor 120 deviates from the handle centerline 170 of the electric handle 10, and the gap 150 where the swing motor 120 deviates from the handle centerline 170 increases, the vibration control mass 160 is installed on the outer shell of the swing motor 120 corresponding to the gap 150. The inclined installation of the swing motor 120 makes the gap 150 larger, thus it is easier to install the vibration control mass 160. Meanwhile, it makes the electric handle 10 deviate from the motor axis line 180. According to the moment of inertia of formula (1), the moment of inertia of the electric handle 10 increases after deviation, which further reduces the vibration amplitude of the electric handle 10. When applied to electric toothbrush, it also makes the toothbrush head inclined, which accords with ergonomics and makes it easier to brush teeth.

The applicant also tested and compared the solutions with and without the vibration control mass 160. The following is the test process and results:

A toothbrush head 210 is added to the swing motor 120 as a load, and the tail end 124 of the motor provided with a resilient cushion member 140 is connected with a main body bracket 131. The circuit board 133 and battery 132 are mounted on the main body bracket 131, the front end of the swing motor 120 and the back end of the main body bracket are supported by elastic elements, and the swing motor 120 is driven to swing by a driving circuit with 30800 swing/minute.

Scratches are made on the toothbrush head 210 to indicate the changes of vibration amplitude of the brush head load, and rigid pointers are respectively fixed on the outer shell of the swing motor 120 and circuit board to indicate vibration amplitudes of the outer shell of the swing motor 120 shell and circuit board. (The indicating device does not consider its distance to the swing center)

TABLE 1

| Experimental solution | | Indicated vibration amplitude of brush head load | Indicated vibration amplitude of the outer shell of motor | Indicated vibration amplitude of the circuit board |
|---|---|---|---|---|
| 1 | Without vibration control mass | 1.50 mm | 0.72 mm | <0.08 mm |
| 2 | With 8 grams of vibration control mass | 1.88 mm | 0.30 mm | <0.04 mm |

TABLE 1-continued

| Experimental solution | | Indicated vibration amplitude of brush head load | Indicated vibration amplitude of the outer shell of motor | Indicated vibration amplitude of the circuit board |
|---|---|---|---|---|
| 3 | With 16 grams of vibration control mass | 1.89 mm | 0.18 mm | <0.04 mm |

The brush head load in Table 1 indicates the vibration amplitude, the larger the value is, the greater the effective swing transmitted to the toothbrush head. The smaller the indicated vibration amplitude of the outer shell of the motor is, the better; the smaller the value is, the smaller the useless swing transmitted by the outer shell of the motor. The smaller the indicated vibration amplitude of the circuit board is, the better; the smaller the value is, the smaller the swing of the swing motor transmitted to the circuit board through the resilient cushion member 140. The indicated vibration amplitudes of the brush head load in experimental solution 2 and experimental solution 3 are obviously larger than that in experimental solution 1. While the indicated vibration amplitudes of the outer shell of motor in experimental solution 2 and experimental solution 3 are much smaller than that in experimental solution 1, and the indicated vibration amplitude of the outer shell of motor in experimental solution 3 is smaller than that in experimental solution 2. It can be seen that the vibration control mass with relatively large mass can improve the effective swing output from the swing motor and reduce the useless swing output from the outer shell of the swing motor. The indicated vibration amplitude of the circuit board is relatively small, which indicates that the vibration reduction effect of the resilient cushion member 140 is obvious. However, because the fixed platform in the experiment is equivalent to the outer shell of the electric handle, and its mass is far greater than that of the outer shell of the electric handle, the indicated vibration amplitude of the circuit board is small. The experiment only verifies the principle and effect. In real practice, the swing of the electric handle and circuit board would be larger than the experimental data.

Further analysis of the data in Table 1 shows that when the vibration control mass is increased to a certain value, the change of the indicated vibration amplitude of the brush head load is very small, and the change of the indicated vibration amplitude of the outer shell of the swing motor is gradually reduced. Therefore, by installing a limited mass of vibration control mass 160, such as adding 8 grams of vibration control mass, an expected effect can be achieved, that is, the unfavorable vibration amplitude of the outer shell of the swing motor 120 can be reduced, and the effective vibration amplitude output by the swing motor 120 can be increased, so as the favorable swing of the toothbrush head 210 is strengthened.

As shown in FIG. 5, the embodiment further provides an electric toothbrush 20, including the above-described electric handle 10 and a toothbrush head 210, the toothbrush head 210 is inserted at the output shaft 121 of the swing motor 120.

The electric toothbrush 20 provided by the present disclosure adopts the above-described electric handle 10. By installing a vibration control mass 160 with limited mass on the outer shell of the swing motor 120, the vibration amplitude of the housing 110 of the swing motor 120 is reduced. It also reduces the vibration amplitude transmitted to the control circuit board 133, battery 132 and housing 110, decreases the vibration in user's hand to improve hand feeling, increases the effective vibration amplitude output by the swing motor 120, strengthens the favorable swing transmitted to the toothbrush head 210. Therefore, the vibration reduction effect is better for the handle. Users may feel more comfortable when use it and the cleaning effect of toothbrushing is better. Therefore, a swing motor with small size and light weight may be adopted, the installation is more flexible, and the inclination angle can be adjusted as required, so that the toothbrush head is inclined, which conforms to ergonomics, and is more convenient when user brushes teeth, as shown in FIG. 5. It also makes the moment of inertia of the handle larger and further reduces the vibration of the handle.

The embodiment further provides an electric cleaning brush, including the above-described electric handle 10 and a cleaning brush head, the cleaning brush head is inserted at the output shaft 121 of the swing motor 120.

The electric cleaning brush in this embodiment adopts the above-described electric handle 10, which fundamentally reduces the vibration amplitude of the housing 110 of the swing motor 120 by installing a vibration control mass 160 with limited mass on the outer shell of the swing motor 120. It also reduces the vibration amplitude of the housing 110 transmitted to the control circuit board 133, battery 132 and electric handle 10, decreases the vibration in user's hand to improve hand feeling. Meanwhile, the effective vibration amplitude output by the swing motor 120 is increased, so that the favorable swing of the cleaning brush head is strengthened, the vibration reduction effect of the handle is better and the cleaning effect is better. The electric cleaning brush drives bristles to vibrate rapidly, which can conveniently clean cups, fruits or other articles.

The above are only preferred embodiments of the disclosure, not intended to limit the disclosure. Any modifications, equivalent substitutions and improvements made within the spirit and principle of the disclosure shall be included in the protection scope of the disclosure.

What is claimed is:

1. An electric handle, comprising a housing, a rear cover, a swing motor and a main control structure; an installation cavity is formed in the housing and the rear cover, and the swing motor and the main control structure are serially installed in the installation cavity, one behind another; the swing motor is provided with an output shaft, and the output shaft of the swing motor extends from an front end of the housing; the main control structure comprises a main body bracket and a battery and a control circuit board installed on the main body bracket; the main body bracket is clamped on an inner wall of the housing; and characterized in that a gap is formed between the swing motor and the inner wall of the housing, and a vibration control mass is arranged at the gap, the vibration control mass is fixed on an outer shell of the swing motor and does not contact with the inner wall of the housing.

2. The electric handle of claim 1, wherein a front end of the swing motor is sleeved with a sealing top ring and an elastic sealing ring, the elastic sealing ring sleeved on the output shaft is tightly pressed by the sealing top ring, the elastic sealing ring is pressed against the front end of the housing; a tail end of the swing motor is installed on the main body bracket through a resilient cushion member sleeved on the swing motor.

3. The electric handle of claim 1, wherein the number of the vibration control masses is one or more, the shape is flat, and the vibration control mass is installed and fixed on the outer shell of the swing motor corresponding to the gap.

4. The electric handle of claim 1, wherein the vibration control mass is fixed on the outer shell of the swing motor corresponding to the gap in a semi-wrapped shape.

5. The electric handle of claim 1, wherein the outer shell of the swing motor is provided with a concave part, and a conformal vibration control mass is fixedly installed at the concave part, and the conformal vibration control mass is matched with a longitudinal contour of the swing motor.

6. The electric handle of claim 1, wherein the swing motor is obliquely installed in the housing, so that the axis line of the swing motor deviates from the centerline of the electric handle, and the gap where the swing motor deviates from the centerline of the electric handle increases.

7. An electric toothbrush, comprising an electric handle and a toothbrush head, wherein the electric handle is the electric handle of claim 1, and the toothbrush head is inserted at the output shaft of the swing motor.

8. An electric toothbrush, comprising an electric handle and a toothbrush head, wherein the electric handle is the electric handle of claim 2, and the toothbrush head is inserted at the output shaft of the swing motor.

9. An electric toothbrush, comprising an electric handle and a toothbrush head, wherein the electric handle is the electric handle of claim 3, and the toothbrush head is inserted at the output shaft of the swing motor.

10. An electric toothbrush, comprising an electric handle and a toothbrush head, wherein the electric handle is the electric handle of claim 4, and the toothbrush head is inserted at the output shaft of the swing motor.

11. An electric toothbrush, comprising an electric handle and a toothbrush head, wherein the electric handle is the electric handle of claim 5, and the toothbrush head is inserted at the output shaft of the swing motor.

12. An electric toothbrush, comprising an electric handle and a toothbrush head, wherein the electric handle is the electric handle of claim 6, and the toothbrush head is inserted at the output shaft of the swing motor.

\* \* \* \* \*